US005742951A

United States Patent [19]
Wright et al.

[11] Patent Number: 5,742,951
[45] Date of Patent: Apr. 28, 1998

[54] INLET VALVE MECHANISM

[75] Inventors: Sonny Rene Wright, Coburg; Peter Ross Dunstan, Verdun; Luke Daniel Streeter, Goolwa, all of Australia

[73] Assignee: Caroma Industries Limited, Queensland, Australia

[21] Appl. No.: 756,624

[22] Filed: Nov. 26, 1996

Related U.S. Application Data

[63] Continuation-in-part of Ser. No. 527,449, Sep. 13, 1995, abandoned.

[30] Foreign Application Priority Data

Sep. 29, 1994 [AU] Australia ................... PM8494

[51] Int. Cl.$^6$ ................................................. E03D 1/34
[52] U.S. Cl. ............................ 4/381; 4/379; 4/331
[58] Field of Search ......................... 4/381, 379, 383, 4/384, 331, 353, 415; 137/410, 441, 432, 444

[56] References Cited

U.S. PATENT DOCUMENTS

| 4,843,657 | 7/1989 | Orr ........................... 4/405 |
| 4,901,377 | 2/1990 | Weir .......................... 4/415 |
| 4,965,891 | 10/1990 | Antunez ..................... 4/415 |
| 4,993,086 | 2/1991 | Palmer ....................... 4/415 |
| 5,282,280 | 2/1994 | Wodeslavsky ............... 4/415 |
| 5,285,533 | 2/1994 | Chen et al. ................. 4/415 |
| 5,287,882 | 2/1994 | Mikol ......................... 137/410 |
| 5,327,931 | 7/1994 | Royalty et al. ............. 137/410 |
| 5,542,448 | 8/1996 | Campbell et al. ........... 4/415 |

FOREIGN PATENT DOCUMENTS

| 854 840 | 9/1977 | Belgium . |
| A-0 021 172 | 1/1981 | European Pat. Off. . |
| 0 182 663 | 5/1986 | European Pat. Off. . |
| 364 423 | 11/1922 | Germany . |

Primary Examiner—David J. Walczak
Attorney, Agent, or Firm—Merchant, Gould, Smith, Edell, Welter & Schmidt, P.A.

[57] ABSTRACT

An interlock mechanism (6–9, 41–47) for a cistern or flush tank (1) has an underwater flush valve (3). The interlock mechanism is linked with the float arm (7, 57) of an inlet valve (5, 50). The interlock mechanism latches the float arm in its raised position in the event of a leaky flush valve (3). Thus although a single cistern volume is lost there is no further loss. The next time a flush actuator (10) is operated the interlock mechanism in unlatched allowing the cistern to re-fill. The rising water re-sets the interlock latch mechanism.

3 Claims, 9 Drawing Sheets

INLET VALVE MECHANISM

This is a continuation-in-part of U.S. patent application Ser. No. 08/527,449, filed Sep. 13, 1995, now abandoned.

The present invention relates to cisterns and, in particular, to cisterns having a flush valve.

Cisterns (or flush tanks as they are known in the U.S.A.) can be conveniently categorised into two types. One type of cistern has a flush valve located in its base which is used to block the flush pipe which connects the cistern to the pan. The flush valve is analogous to the plug in a sink or basin which is full of water. When the flush valve is operated, this is equivalent to the plug being removed, and the water in the cistern flows through the flush valve and down the flush pipe.

The other type of cistern is the syphonic cistern in which the flush pipe is connected with the interior of the cistern via an inverted U-shaped passage which at its highest point passes above the maximum water level in the cistern. In order for such a cistern to be flushed it is necessary for the U-shaped passage to be filled with water and thereby induce a syphonic action within the passage which syphons the water from the cistern into the flush pipe.

The cistern incorporating the flush valve suffers from the problem that the flush valve, particularly after a number of years of service, may commence leaking. Such leaking can be brought about because of a number of reasons such as algae growth on the valve, debris which has been introduced into the cistern via the inlet pipe becoming lodged in the flush valve, the perishing of rubber components of the flush valve, and the like. Normally such leaking is not catastrophic, instead there is a trickle of water down the flush pipe and into the lavatory pan.

All cisterns must be provided with a re-filling mechanism which normally takes the form of an inlet valve connected a mains water supply in which the water is under pressure, and a level detecting arrangement which opens the inlet valve when the water level within the cistern drops, and closes the inlet valve when the water level within the cistern rises to its predetermined "full" height or level. The level detecting arrangement is almost universally a float which is connected to the inlet valve by means of a pivoting float arm.

Because of the inlet valve and its float, as water trickles from a cistern with a leaking flush valve, the float drops slightly within the cistern thereby allowing a volume of water to enter the cistern and the level of water within the cistern to be brought back to the full level. This intermittent repetitive operation of the inlet valve keeps the cistern full of water and ready to be flushed on the next occasion when it is required to be used. As a consequence, although the leaking trickle of water into the pan may well be obvious to the persons using the cistern, such a trickle is universally ignored. Even the most vigilant of users is likely to regard such a trickle as merely a precursor which indicates that in many months time some maintenance action may be required in relation to the cistern.

It is well known that cisterns with leaking flush valves waste considerable amounts of water and that in this connection a cistern having a flush valve is very different from the syphonic cistern which is inherently non-leaking. This is because once the flush finishes and the syphonic action is broken, the interconnection between the water in the cistern and the flush pipe includes a passage which lies above the level of water in the cistern and thus no leak is possible. Instead, a deliberate measure must be taken in order to re-commence the syphonic action.

Because of the possibility of cisterns with flush valves wasting large volumes of water, in many jurisdictions cisterns with flush valves are prohibited by law or regulation. Hong Kong is one such jurisdiction where this regulatory regime arises because of historical problems regarding the uncertainty of water supplies.

However, in recent years many advances have been made in relation to flush valve cisterns, particularly in relation to dual flush cisterns which utilise very small volumes of water for a full and half flush (typically 6 and 3 liters respectively). Such dual flush cisterns have found favour with water supply authorities since they enable the volume of water consumed to be substantially reduced. Any saving in water usage is quickly reflected in an ability to defer capital works regarding the construction of additional reservoirs, dams and the like.

It is the object of the present invention to provide a way of overcoming the aversion of water supply authorities to flush valve cisterns in those jurisdictions where flush valve cisterns are prohibited, in order to enable such authorities to take advantage of the water saving and dual flushing characteristics of cisterns having flush valves. This is particularly the case since it is difficult to arrange either a dual flush or a limited volume flush with syphonic style cisterns.

Fundamentally this object is achieved by the realisation that once an inlet valve has operated at the cessation of a flush to refill a cistern, if that inlet valve can be disabled until the next flush is required, then if the flush valve should happen to leak, then the maximum volume of water which can be wasted is the volume of water contained within the cistern.

Furthermore, for practical purposes it is desirable that the disablement of the inlet valve be removed if the cistern is to be flushed. This has the consequence that in the event that there is a leaking flush valve and the cistern is empty at the time that the next flush is required, then the person operating the flush actuator of the cistern observes that no flush is immediately forthcoming yet hears the cistern being refilled. Accordingly, a short time after the first actuation of the flush actuator, the flush actuator can be re-actuated and a flush provided. Thus, although the pan is able to be flushed thereby overcoming any sanitary problem, a clear message that the cistern is not operating normally is given to the user. This enables the fault to be rectified at the soonest possible moment whilst simultaneously preventing the continual leaking of large volumes of water through the faulty flush valve. Under these circumstances, the maximum water volume which can be wasted between successive flushes in the volume of water held by the cistern.

In accordance with the foregoing, a first aspect of the present invention discloses an interlock mechanism for a flush valve operated cistern having a flush valve in the base thereof which, when opened, drains water stored in said cistern to constitute a flush, said cistern further having an actuator mechanism interconnecting a flush actuator with said flush valve to open the latter on operation of said actuator, and an inlet valve having a refill actuator operable in response to the level of water in said cistern to refill same to a predetermined level, wherein said interlock mechanism comprising a latch means interconnected with said refill actuator and said flush actuator and operable to prevent refilling of said cistern, said latch means being releasable by operation of said flush actuator and being re-settable by initial re-filling of said cistern after a flush and wherein said refill actuator includes a first float linked to a float arm which is pivotally connected to said inlet valve and which is adjacent said actuator mechanism, said latch means comprises a pivoted lever extending between said float arm and said actuator mechanism and movable by operation of said actuator mechanism to move an abutment on said pivoted lever out of engagement with a stop member stationary relative to said cistern, and biasing means to return said abutment into engagement with said stop member following operation of said actuator mechanism.

In accordance with the second aspect of the present invention there is disclosed a method of operating a flush valve operated cistern having a flush valve in the base thereof which, when opened, drains water in said cistern to constitute a flush, said cistern further having an actuator mechanism interconnecting a flush actuator with said flush valve to open the latter on operation of said actuator (10), and an inlet valve having a refill actuator operable in response to the level of water in said cistern to refill same to a predetermined level; said method comprising the steps of (1) providing a latch mechanism which is interconnected with said refill actuator and said flush actuator and which is operable to prevent refilling of said cistern, (2) releasing the latch mechanism following operation of the flush actuator, (3) re-setting the latch mechanism following initial refilling of said cistern after a flush, (4) sensing the level of water in said cistern, and (5) securing said latch mechanism to prevent refilling of said cistern if the sensed level of water in the cistern is low, wherein the sensing of the level of water in said cistern is determined by the position of a pivoted locking lever having a float.

Two basic embodiments of the present invention will now be described with reference to the drawings in which.

Figure 1:
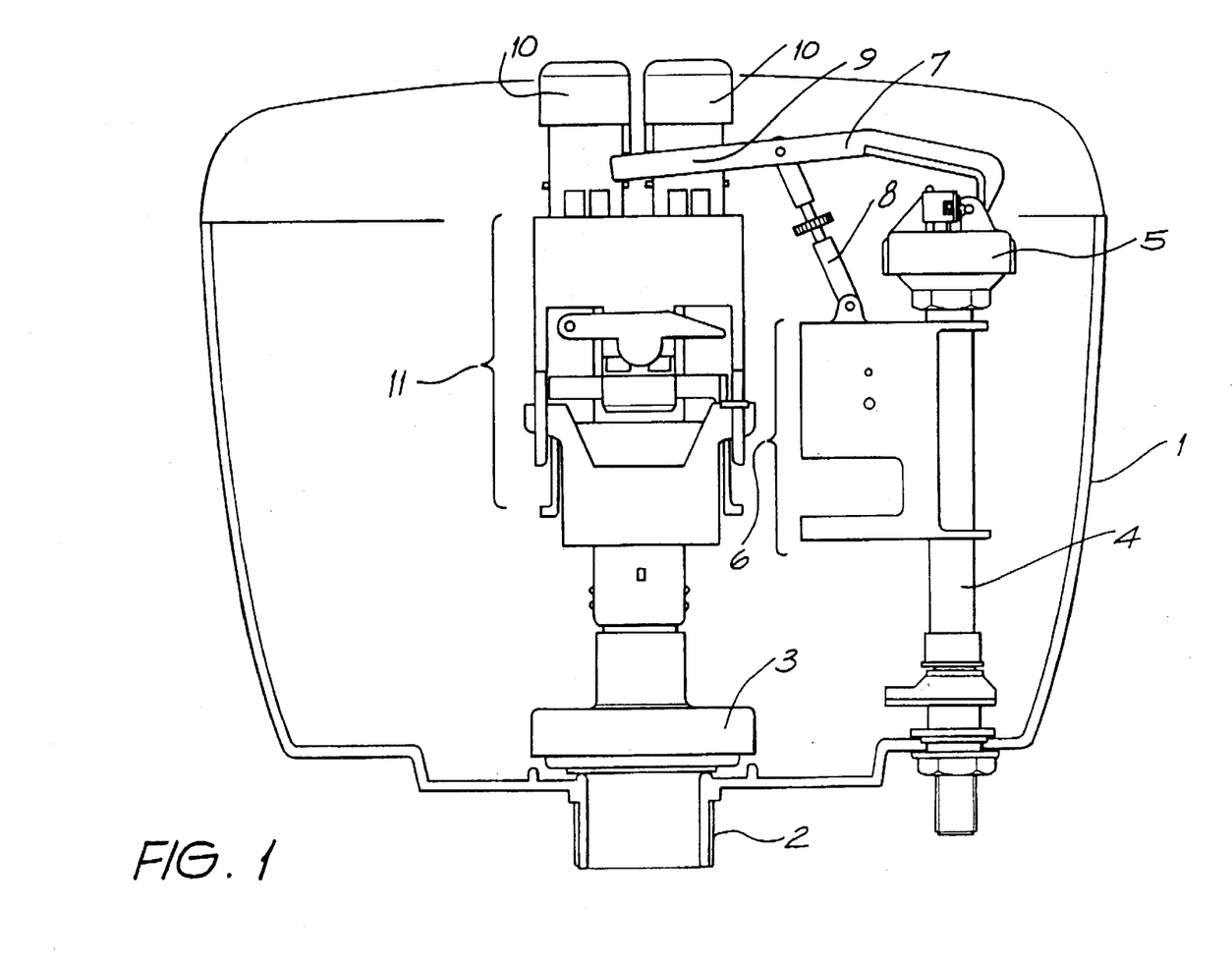
FIG. 1 is a schematic side elevation of the interior of a flush valve operated cistern in accordance with the first embodiment of the present invention.

A first form of the first basic embodiment of the present invention will now be described with reference to FIGS. 1 to 3. As seen in FIG. 1, the cistern 1 is connected to a flush pipe (not illustrated) by a threaded spigot 2 which is normally closed by means of a flush valve 3. The cistern is provided with an inlet stem 4 at the top of which is located an inlet valve 5 and on which is reciprocally mounted a float 6.

The float 6 is connected to the inlet valve 5 by means of a float arm 7 and adjustable linkage 8. The float arm 7 includes a projection 9 which extends underneath a pair of flush actuator buttons 10 which surmount a flush mechanism 11.

The flush mechanism 11 is substantially conventional, and is of the general dual flush type described in Australian Patent No. 597,438 (to which U.S. Pat. No. 4,882,793 corresponds). The inlet valve 5 is of the hydraulic type described in Australian Patent Application No. 72899/94 (previously Application No. PM 1316) and is interconnected to the float arm by means of a rack and pinion arrangement described in Australian Patent Application No. PM 8030. All three of the above referenced patent and patent applications are in the name of the present applicant and the disclosure thereof is hereby incorporated into the present specification by cross reference.

Figure 2:
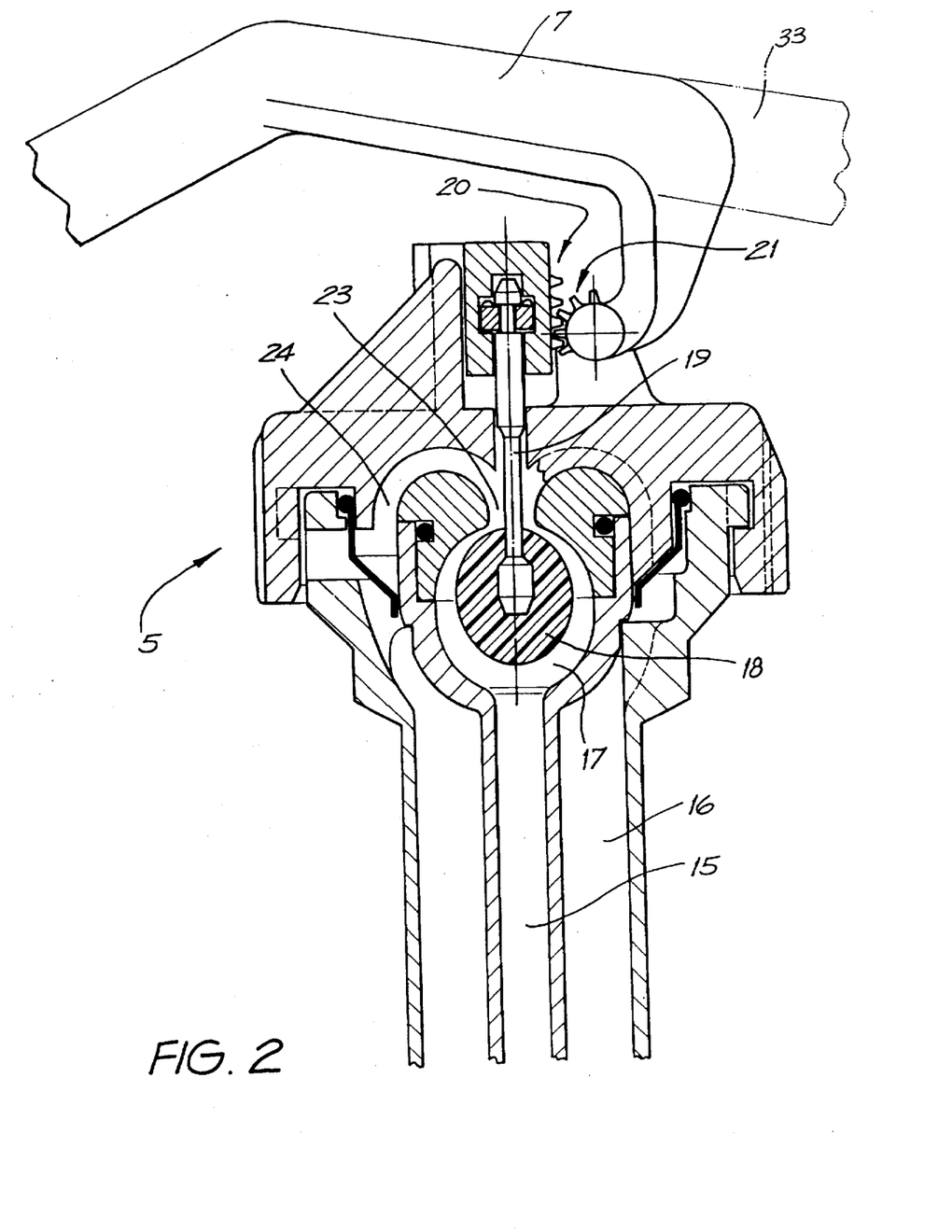
FIG. 2 is a vertical cross-sectional view through the inlet valve utilised with the embodiment of FIG. 1.

In FIG. 2 some detail of the internal mechanism of the inlet valve 5 can be seen. The inlet valve 5 is supplied with water under mains pressure from an inlet 15 which is surrounded by a concentric outlet 16 which leads into the cistern 1. At the upper end of the inlet 15 is a bulbous chamber 17 in which is positioned an egg-like body 18 mounted at the lower end of a spindle 19. The spindle 19 is able to be vertically reciprocated by means of a rack 20 and part pinion 21.

The chamber 17 has an opening 23 which is able to be occluded by the body 18 and thus forms the valve seat. The opening 23 leads via U-shaped passages 24 into the outlet 16. When the spindle 19 is raised, the body 18 occludes the opening 23 and the inlet valve 5 is therefore closed. However, if the float arm 7 is moved downwardly as seen in FIG. 2, then the part pinion 21 is rotated in a counter-clockwise direction therefore driving the spindle 19 downwardly and opening the valve 5. Because of the particular shaping of the body 18 and chamber 17, a balance of flow induced pressure forces is created on the body 18 thereby holding the inlet valve 5 open until the float arm 7 is raised. This is essentially achieved by means of the float 6 in order to close the inlet valve 5. The balance of hydraulic forces means that the net force required to be exerted on the spindle 19 is relatively low.

Figure 3:
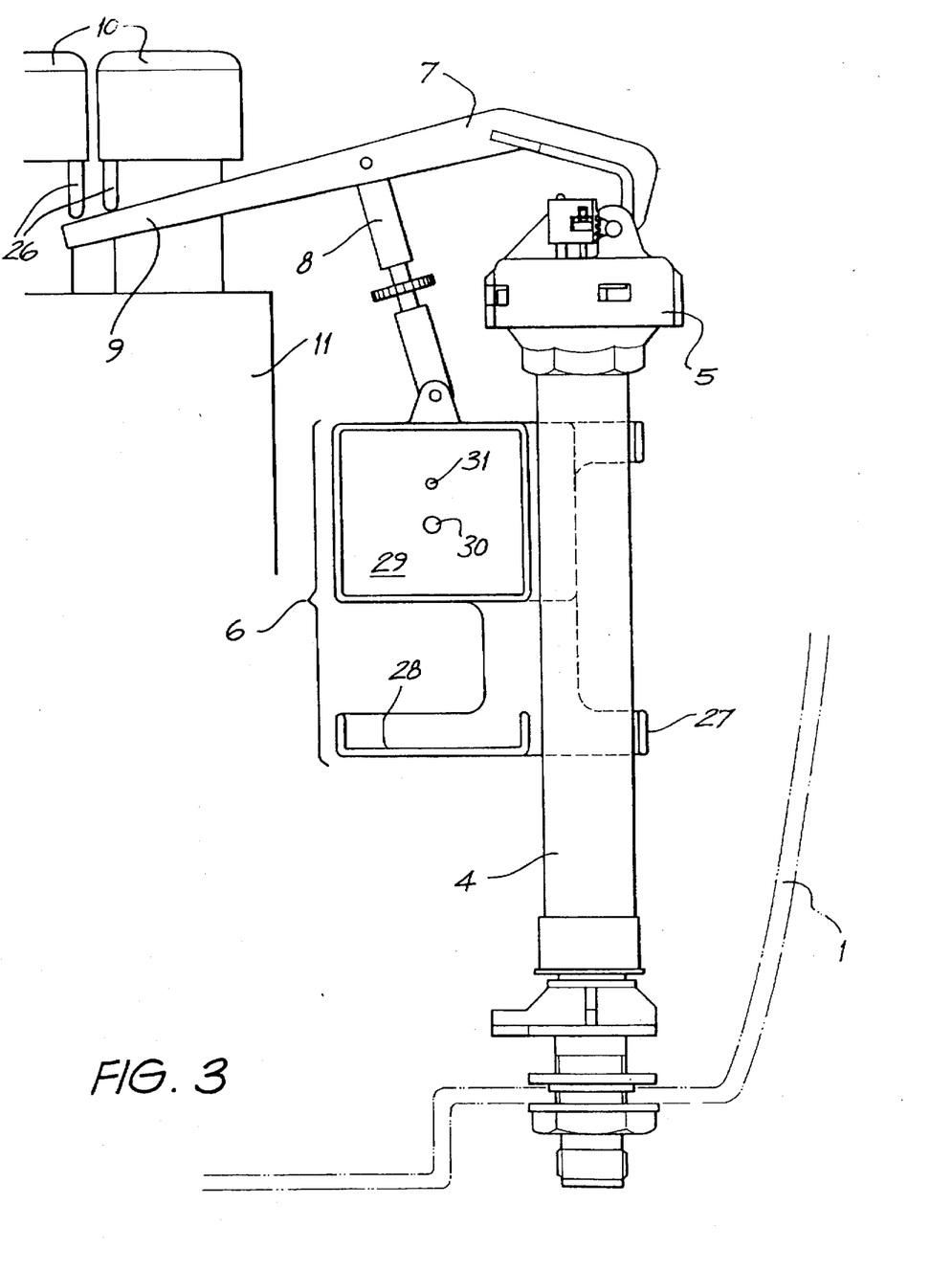
FIG. 3 is a side elevation illustrating the detail of the inlet valve, float, float arm and its interconnection with the flush actuators.

Turning to FIG. 3, it will be seen that each of the flush actuator buttons 10 carries a lug 26 which abuts the float arm 7 in its raised, cistern full, position illustrated in FIG. 3. As a consequence, when either one of the flush actuator buttons 10 is depressed in order to initiate a flushing action, the corresponding lug 26 moves the float arm 7 downwardly from the raised position shown in FIG. 3. This has the effect of opening the inlet valve 5 simultaneously with the raising of the flush valve 3 brought about by the operation of the flush mechanism 11 in response to the actuation of either one of the flush buttons 10. As a consequence, the float 6 begins a descent down the stem 4 since it is supported only by the buoyant force of the falling level of water within the cistern.

As seen in FIG. 3 the float has two cylindrical guides 27 and a shallow bucket 28 which is located below the float chamber 29. The float chamber 29 includes two holes 30 and 31. In the initial position where the cistern is full and prior to the operation of the flush buttons 10, the bucket 28 is full of water and the float chamber 29 is full of water up to the level of the upper hole 31. As a consequence, the float 6 is relatively heavy and as the water drops within the cistern the weight of water within the bucket 28 and float chamber 29 helps drive the float 6 downwardly along the stem 4. At the same time, water is passing out through the hole 30 so that as the cistern empties, water within the float chamber 29 has dropped to the level of the lower hole 30.

At the completion of the flush, the cistern commences refilling and the float 6 is at its lowermost position. As the water rises past the float chamber 29, it again becomes buoyant and commences to rise whilst also slowly filling with water due to the presence of holes 30 and 31. Thus the float 6 rises, however, its speed of rise is reduced or braked by the weight of water present in the bucket 28. As a consequence, the inlet valve 5 closes slowly thereby substantially preventing water hammer.

When the cistern has refilled, the float 6 returns to its original position in which the float chamber 29 is full of water up to the level of the upper hole 31 and the flushing cycle is ready to recommence. Above the upper hole 31 is entrapped air which maintains an upwardly directed buoyant force on the float arm 7. This aids the water pressure force on the body 18 which keeps the inlet valve 5 closed.

However, in the event that the flush valve 3 should happen to leak, then water within the cistern 1 slowly drains away through the spigot 2. However, the weight of water within the float chamber 29 and bucket 28 is insufficient to initiate opening of the inlet valve 5. As a consequence, the cistern 1 is empty on a next occasion when one of the flush actuator buttons 10 is depressed. Therefore, there is no immediate flush from the cistern and the person operating the actuator button 10 is aware that something is amiss. However, the depression of the button 10 lowers the float arm 7 thereby opening the inlet valve 5. As a consequence, the person operating the cistern is aware that the cistern is refilling. As soon as the cistern has refilled, or substantially refilled, the actuator button 10 is able to be pressed again thereby correctly initiating the desired flush.

Figure 4:
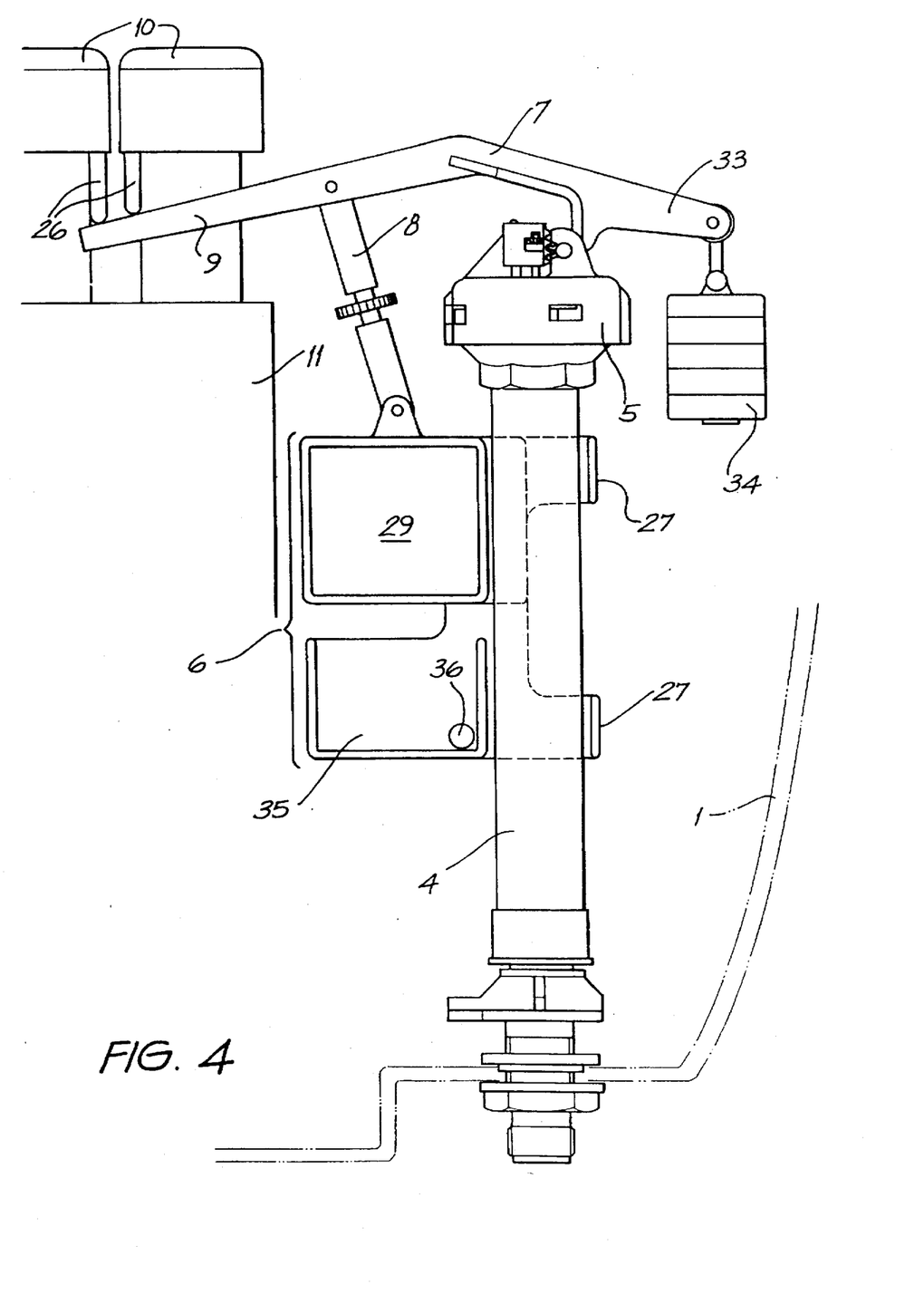
FIG. 4 is a view similar to FIG. 3 but illustrating a modified version of that basic embodiment.

In FIG. 4 a variation of the first basic arrangement described in FIGS. 1 to 3 is illustrated. Essentially the arrangement is as before save that the float arm 7 includes an extension 33 from which hangs a counterweight 34. The float chamber 29 is empty and airtight and in place of the shallow bucket 28 a large bucket 35 is provided having a drain hole 36.

When the cistern 1 is full the bucket 35 is full and the float 6 is in its uppermost position. As before, operation of one of the flush buttons 10 initiates the flushing mechanism and also pushes float arm 7 downwardly so as to open the inlet valve 5. As the water level within the cistern falls during the flush, the weight of water in the bucket 35 continues the downward movement of the float arm 7.

As the cistern 1 empties, so too does the bucket 35, the water draining therefrom via the drain hole 36. As a consequence, when the float 6 has reached its lowermost position, the bucket 35 is substantially empty. As the cistern re-fills, the bucket 35 is substantially buoyant and this, together with the counterweight 34, is sufficient to enable the float 6 to rise together with the water level in the cistern. As a consequence, the flush cycle is completed and the cistern is re-set. Again the filling bucket 38 brakes the rise of the float 6.

Should the flush valve 3 happen to leak then the water can drain from the cistern 1 via the spigot 2. However, the weight of water within the bucket 35 is insufficient to cause the inlet valve 5 to open. Furthermore, as the water slowly drains from the cistern 1 the water also drains from the bucket 35 via the hole 36. Therefore the cistern 1, although empty, is not refilled.

Again, in the event that one of the flush buttons 10 is operated, no flush is produced since the cistern is empty. However, the downward movement of the float arm 7 initiates opening of the inlet valve 5 and refilling of the cistern. A subsequent operation of the flush button 10 then initiates the desired flush. Again the user of the toilet is alerted to the fact that the cistern is not functioning normally and that maintenance is required.

Figure 5:
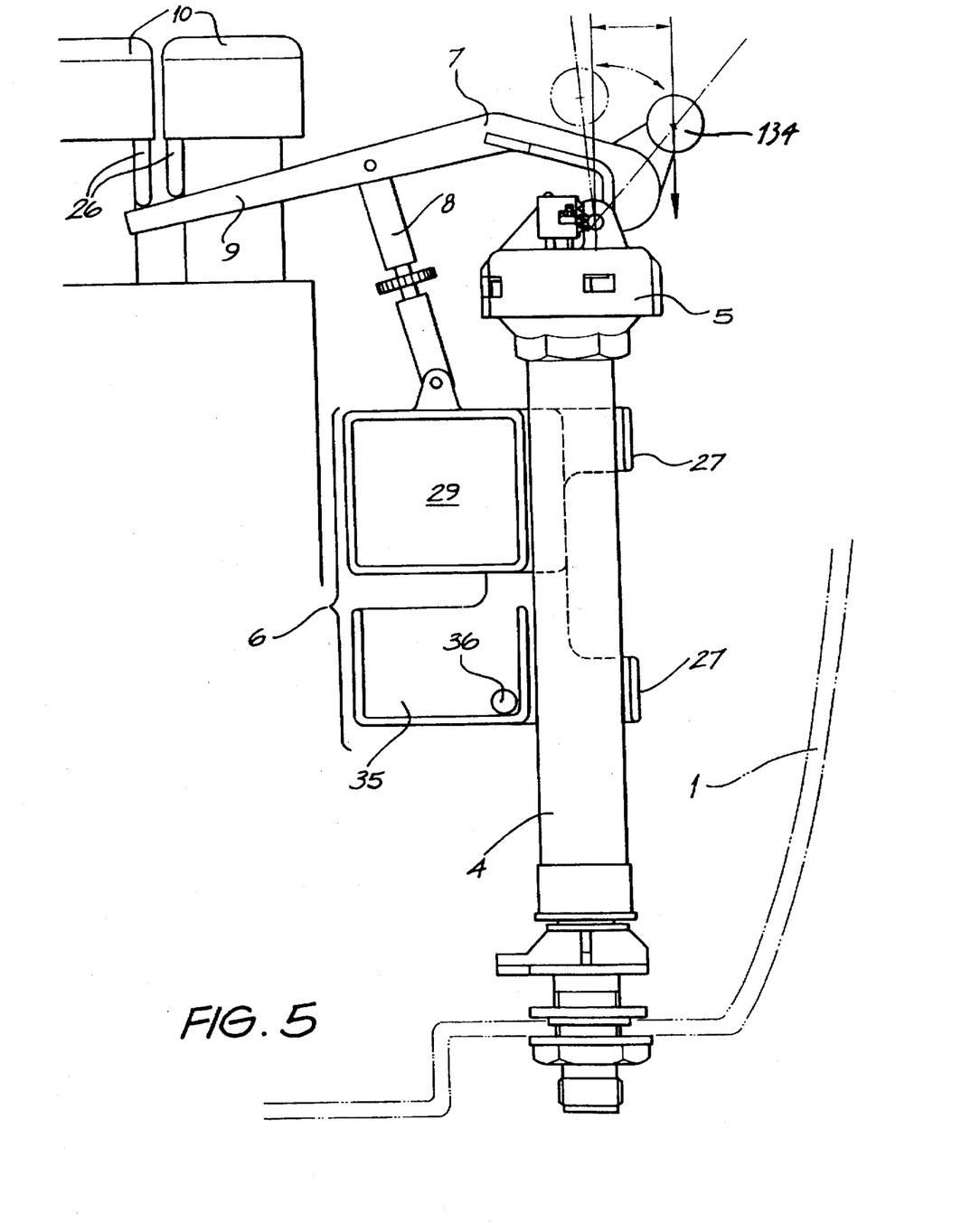
FIG. 5 is a view similar to FIG. 4 but illustrating a still further modification.

In FIG. 5 a still further variation of the basic arrangement of FIGS. 1 to 3 is illustrated. This variation is essentially the same as in FIG. 4 save that the hanging weight 34 is replaced by a counterweight 134 which is rigidly mounted on the float arm 7.

When this cistern is full, the counterweight 134 is in the position illustrated in solid lines in FIG. 5. However, when the cistern is substantially empty the float arm pivots in an anti-clockwise direction as seen in FIG. 5 so as to place the counterweight 134 in the over-centre position illustrated in phantom in FIG. 5. The remainder of the arrangement is as illustrated in FIG. 4.

In operation, with the cistern full, the weight, and hence clockwise directed torque, of the counterweight substantially balances the anti-clockwise directed torque of the float 6, arm 7 and linkage 8. Thus once the valve 5 is in the closed position, in which the inlet water pressure keep the valve body 18 in the closed (raised) position, there is a negligible downward force acting on the spindle 19 and valve body 18. As a result, there is substantially in minimum inlet water pressure below which the valve 5 will open without operation of a flush actuator button 10. This is especially useful in those applications, such as a water header tank, where the pressure of water in the inlet stem 4 is relatively low.

Furthermore, when the cistern is being emptied, once the counterweight 134 goes over-centre, the weight of the counterweight 134 assists the fall of the float 6 bearing in mind that the bucket 35 is being progressively drained, and hence lightened in weight, via hole 36. In addition, the weight of the counterweight 134 in the over-centre position slows the rise of the float during cistern re-filling. This keeps the valve 5 open to a larger extent for a longer time and thus decreases the filling time.

Finally, as the cistern approaches full, the counterweight 134 passes through the vertical position. As a result, the weight and torque created by the counterweight 134 tend to close the valve 5 more quickly bringing about a speedy finish to the cistern filling action.

Turning now to FIGS. 6 to 9, the second basic embodiment of the present invention will now be described. Like parts will continue to be designated by like numerals. Here the cistern 1 has a flush valve 3, and inlet stem 4, flush actuator buttons 10 and flush mechanism 11 substantially as before. However, mounted atop the inlet stem 4 is a conventional inlet valve 50 having a conventional float arm 57 and float 56.

Figure 6:
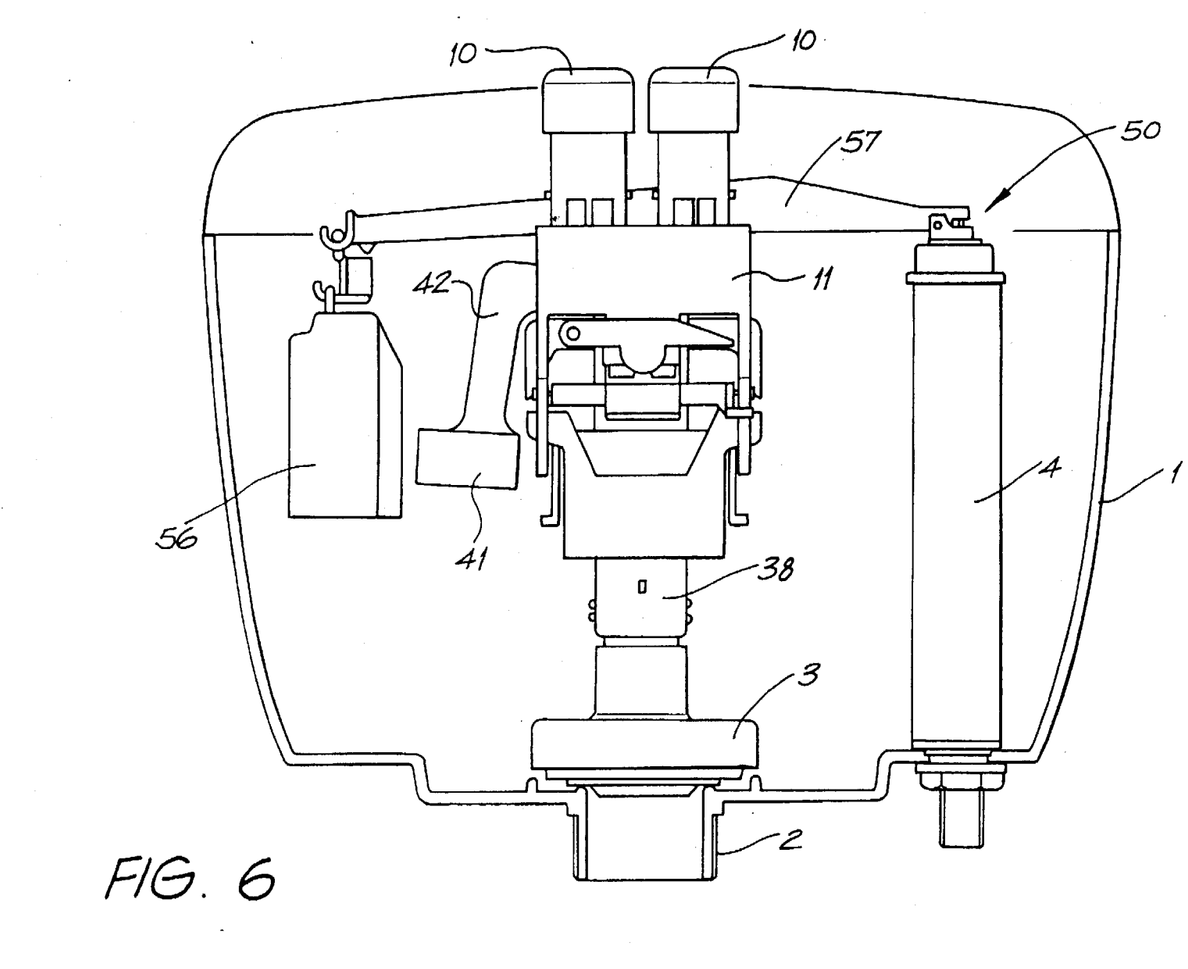
FIG. 6 is a side elevational view of the interior of a flush valve operated cistern utilising a second basic embodiment.
Figure 7:
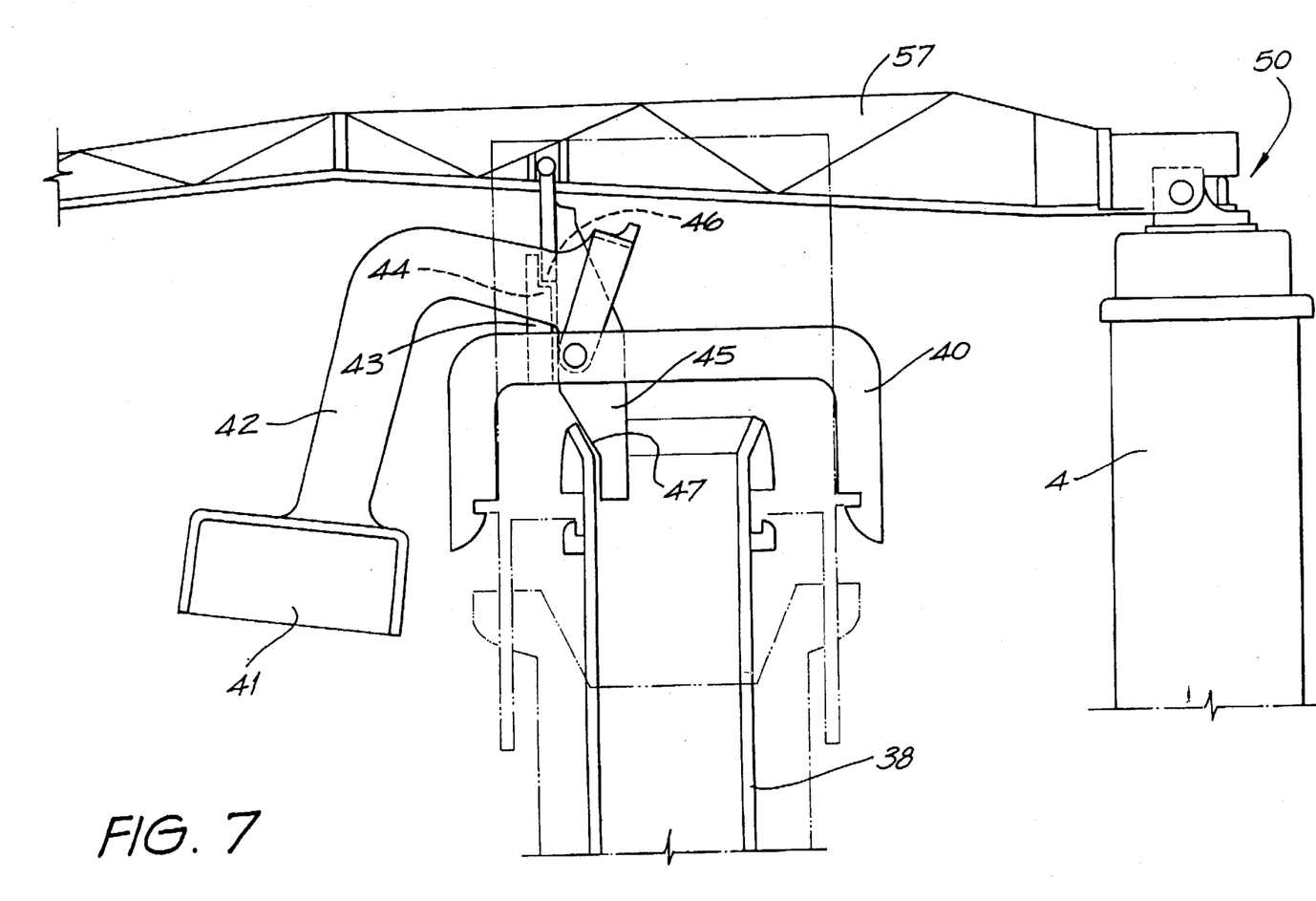
FIG. 7 is a close up side elevational view of the top of the flush mechanism in the latch set position.

The flush valve 3 is provided with a hollow rectangular float stem 38, the lower portion of which is illustrated in FIG. 6 and the upper portion of which is illustrated in FIG. 7. The hollow float stem 38 functions as an overflow tube in conventional manner. Straddling the flush mechanism 11 and passing over the top of the float stem 38 is a saddle 40 on which is pivoted a downwardly directed cup 41. The cup 41 is pivoted on the saddle 40 by means of an L-shaped arm 42. Secured to the saddle 40 is an erect upstand 43 which includes a lip 44 which provides a flat surface or step. Pivoted from the float arm 57 is a pendulous stay 45 which includes a notch 46 towards its middle and a ramp 47 at its lower end.

In the initial position illustrated in FIG. 7 in which the cistern is full, the stay 45 is substantially vertical and the notch 46 is engaged with the lip 44. As a consequence, the float arm 57 is immobilised and unable to drop should the water level within the cistern fall.

Figure 8:
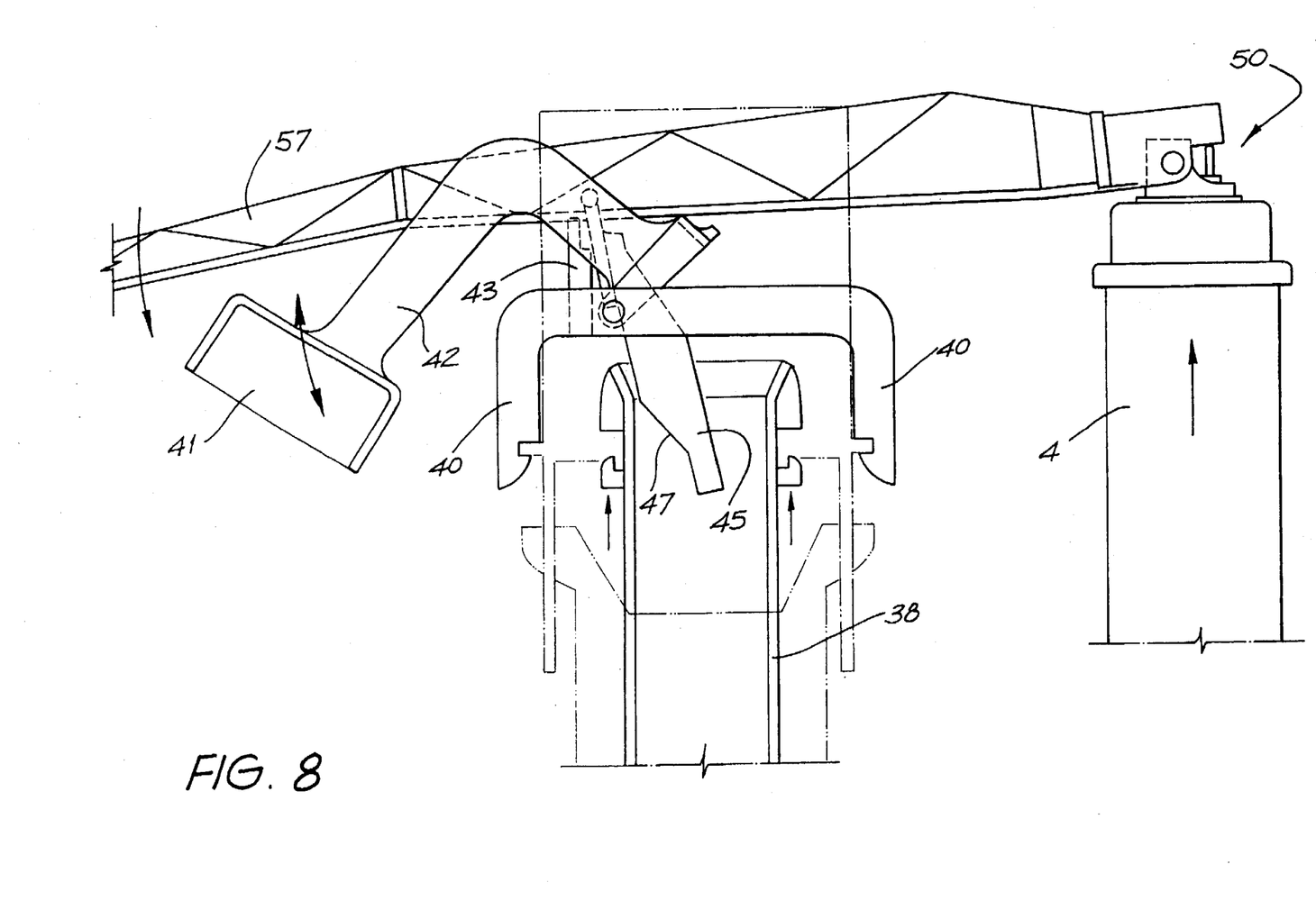
FIG. 8 is a view similar to FIG. 7 but showing release of the latch.

As indicated in FIG. 8, in the event that one of the actuator buttons 10 (FIG. 6) is depressed, then the conventional flush mechanism 11 raises the float stem 38 in order to open the flush valve 3. The upward movement of the float stem 38 moves the upper lip of the float stem 38 along the ramp 47 thereby tilting the stay 45 in an anti-clockwise direction to the position shown in FIG. 7. This disengages the notch 46 and lip 44 thereby allows the float arm 57 to pivot in an anti-clockwise direction as seen in FIG. 7. This allows the inlet valve 50 to permit water to enter the cistern 1 in order to refill the cistern. The fall and subsequent rise of water within the cistern 1 means that the downwardly directed cup 41 which functions as a float permits the L-shaped arm 42 to firstly pivot in a clockwise direction as the water level falls, and then pivot in an anti-clockwise direction as the water level rises. Since the stay 45 and lip 44 of the upstand 43 are disengaged during this period, the movement of the L-shaped arm 42 is of no effect.

Figure 9:
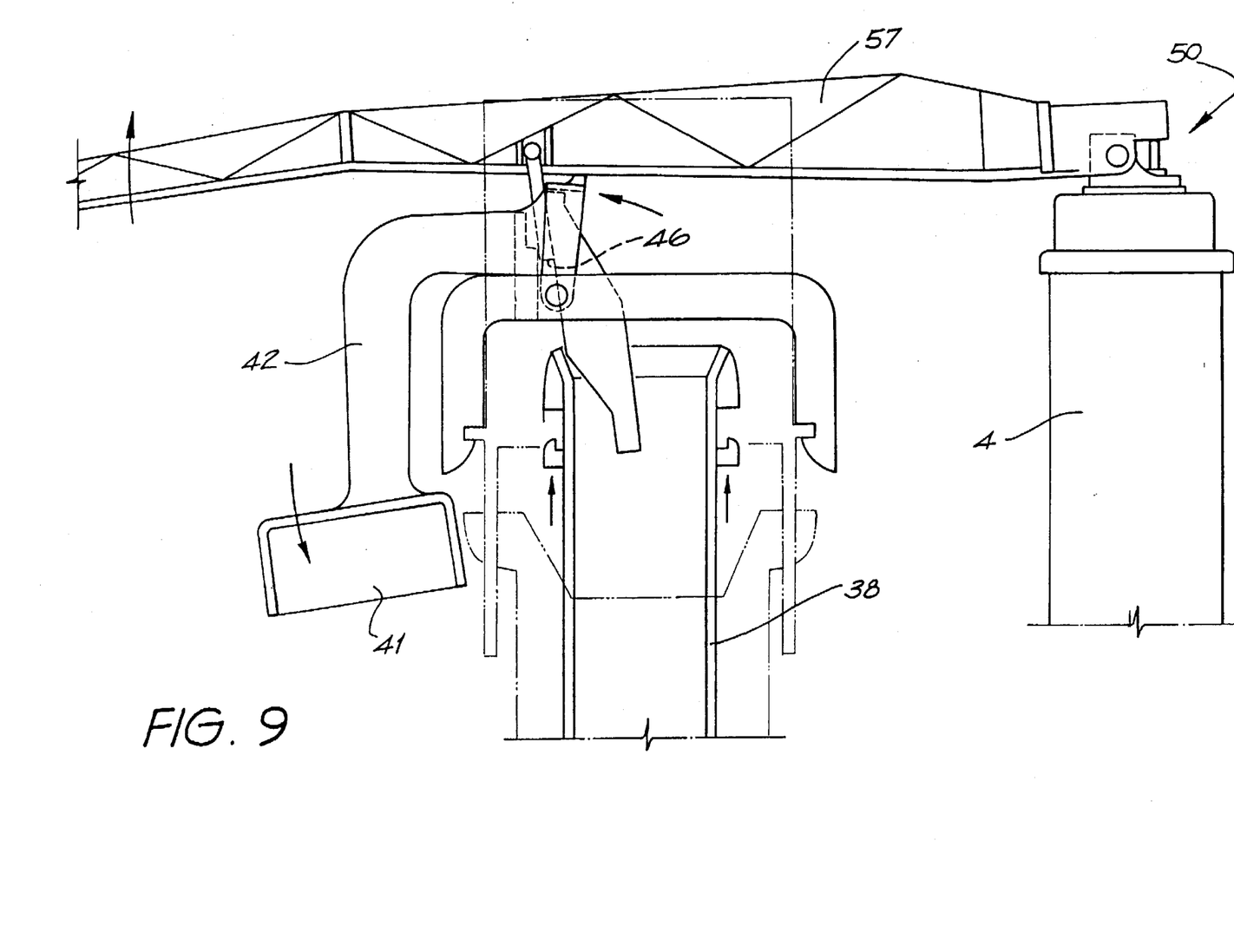
FIG. 9 is a view similar to FIGS. 7 and 8 but showing re-setting of the latch.

From the position illustrated in FIG. 7, if the flush valve 3 should happen to leak slowly, then the cup 41 falls slowly with the falling water level until it reaches essentially the position illustrated in FIG. 9. In this position, the pivoted end of the L-shaped arm 42 lies against the stay 45. As the stay 45 is in the position illustrated in FIG. 7, the arm 42 urges the notch 46 into firmer engagement with the lip 44. As a consequence, notwithstanding the fall in the level of water within the cistern 1, the float arm 57 does not fall and no water is allowed to enter the cistern 1. This position is stable and remains so until the next occasion on which either one of the flush actuator buttons 10 is depressed thereby raising the float stem 38.

When the float stem 38 is raised, the stay 45 is again jolted by the upper lip of the float stem 38 so as to disengage the notch 46 and lip 44. In this way the latch in the form of stay 45 which previously restrained the motion of the float arm 57, is released. The cistern 1 then immediately begins to fill since the float arm 57 allows the inlet valve 50 to permit water to enter the cistern 1.

At the conclusion of the flushing action, the float stem 38 and flush valve 3 fall thereby closing off the cistern 1 and allowing the water level within the cistern to rise. This moves the float arm 57 in the clockwise direction as seen in FIG. 9 and again re-engages the lip 44 and notch 46. This again latches the stay 45 and returns the mechanism to the position illustrated in FIG. 7.

In view of the foregoing it will be seen that even it the flush valve 3 should leak, the maximum amount of water wasted between successive flushes is only the volume of water contained within the cistern 1. Furthermore, on the first operation of the flush actuator button 10, no flush is produced. However, it is immediately apparent to the user that the cistern 1 is being refilled. A subsequent operation of a flush actuator button 10 produces the necessary flush, but the person using the cistern to flush the toilet is advised (by the changed operation from the normal immediate flush following depression of the flush actuator button 10) that the cistern is not operating in its usual manner and should therefore be serviced.

The foregoing describes only two embodiments of the present invention and modifications, obvious to those skilled in the art, can be made thereto without departing from the scope of the present invention.

We claim:

1. An interlock mechanism for a flush valve operated cistern having a flush valve in the base thereof which, when opened, drains water stored in said cistern to constitute a flush, said cistern further having an actuator mechanism interconnecting a flush actuator with said flush valve to open the latter on operation of said actuator, and an inlet valve having a refill actuator operable in response to the level of water in said cistern to refill same to a predetermined level, wherein said interlock mechanism comprising a latch means interconnected with said refill actuator and said flush actuator and operable to prevent refilling of said cistern, said latch means being releasable by operation of said flush actuator and being re-settable by initial re-filling of said cistern after a flush and wherein said refill actuator includes a first float linked to a float arm which is pivotally connected to said inlet valve and which is adjacent said actuator mechanism, said latch means comprises a pivoted lever extending between said float arm and said actuator mechanism and movable by operation of said actuator mechanism to move an abutment on said pivoted lever out of engagement with a stop member stationary relative to said cistern, and biasing means comprising gravity acting on said pivoted lever to return said abutment into engagement with said stop member following operation of said actuator mechanism, wherein said interlock mechanism further includes a latch securing mechanism comprising a second float mounted for movement with a pivoted locking lever and pivotable to bear against said pivoted lever with decreasing water levels in said cistern to secure said abutment and stop member in mutual engagement if said water level drops prior to actuation of said actuator mechanism.

2. An interlock lever as claimed in claim 1 wherein said pivoted lever depends from said float arm, and a rising water level in said cistern raises said lever to align said abutment and stop member.

3. A method of operating a flush valve operated cistern having a flush valve in the base thereof which, when opened, drains water in said cistern to constitute a flush, said cistern further having an actuator mechanism interconnecting a flush actuator with said flush valve to open the latter on operation of said actuator (10), and an inlet valve having a refill actuator operable in response to the level of water in said cistern to refill same to a predetermined level; said method comprising the steps of (1) providing a latch mechanism which is interconnected with said refill actuator and said flush actuator and which is operable to prevent refilling of said cistern, (2) releasing the latch mechanism following operation of the flush actuator, (3) re-setting the latch mechanism following initial refilling of said cistern after a flush, (4) sensing the level of water in said cistern, and (5) securing said latch mechanism to prevent refilling of said cistern if the sensed level of water in the cistern is low, wherein the sensing of the level of water in said cistern is determined by the position of a pivoted locking lever having a float.

* * * * *